United States Patent
Lee et al.

(10) Patent No.: US 8,718,391 B2
(45) Date of Patent: May 6, 2014

(54) RANDOM ACCESS IMAGE ENCODING SYSTEM AND METHOD

(75) Inventors: Sang Jo Lee, Suwon-si (KR); Shi Hwa Lee, Seoul (KR); Do-Hyung Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 294 days.

(21) Appl. No.: 12/805,452

(22) Filed: Jul. 30, 2010

(65) Prior Publication Data

US 2011/0069900 A1    Mar. 24, 2011

(30) Foreign Application Priority Data

Sep. 22, 2009    (KR) ........................ 10-2009-0089764

(51) Int. Cl.
*G06K 9/36* (2006.01)
*G06K 9/46* (2006.01)
*H04N 7/26* (2006.01)
*H04N 7/50* (2006.01)

(52) U.S. Cl.
CPC ......... *H04N 19/00* (2013.01); *H04N 19/00278* (2013.01); *H04N 19/00781* (2013.01)
USPC ............................. 382/238; 382/232; 382/233

(58) Field of Classification Search
None
See application file for complete search history.

(56) References Cited

U.S. PATENT DOCUMENTS

| | | | |
|---|---|---|---|
| 2003/0007781 A1* | 1/2003 | Boon | 386/68 |
| 2008/0131087 A1* | 6/2008 | Lee et al. | 386/112 |
| 2008/0175489 A1* | 7/2008 | Lee et al. | 382/232 |
| 2008/0175498 A1* | 7/2008 | Lee et al. | 382/238 |
| 2008/0317116 A1* | 12/2008 | Lee et al. | 375/240.01 |
| 2009/0067734 A1* | 3/2009 | Kalevo | 382/238 |
| 2009/0135921 A1* | 5/2009 | Lei et al. | 375/245 |
| 2010/0220936 A1* | 9/2010 | Yamaguchi et al. | 382/238 |

FOREIGN PATENT DOCUMENTS

| | | |
|---|---|---|
| JP | 11-168725 | 6/1999 |
| KR | 1999-0064023 | 7/1999 |
| KR | 10-322594 | 1/2002 |
| KR | 10-2007-0047523 | 5/2007 |
| KR | 10-2007-0049816 | 5/2007 |
| KR | 10-2008-0019075 | 3/2008 |
| KR | 10-2008-0058128 | 6/2008 |
| KR | 10-2009-0004362 | 1/2009 |

\* cited by examiner

*Primary Examiner* — Li Liu
(74) *Attorney, Agent, or Firm* — Staas & Halsey LLP

(57) ABSTRACT

An image encoding system and method for performing random access may be provided. The image encoding system may perform intra prediction based on a processing unit, and code a pixel using a result of the intra prediction. Also, the image encoding system may generate a bitstream with respect to an input image using a Fixed Length Code (FLC). Coding may be performed based on the processing unit, and thus random access may be performed based on the processing unit.

36 Claims, 14 Drawing Sheets

US 8,718,391 B2

RANDOM ACCESS IMAGE ENCODING SYSTEM AND METHOD

CROSS-REFERENCE TO RELATED APPLICATIONS

This application claims the benefit of Korean Patent Application No. 10-2009-0089764, filed on Sep. 22, 2009, in the Korean Intellectual Property Office, the disclosure of which is incorporated herein by reference.

BACKGROUND

1. Field

One or more embodiments relate to an image encoding system and method, and more particularly, to an image encoding system and method that may perform coding based on a processing unit including at least one block, and thereby may perform random access with respect to a portion of a corresponding image.

2. Description of the Related Art

Significant bandwidth and/or large memory capacities are required to process an image. Since an entire image is generally processed based on a pixel or block level of the image, processing of all pixels or blocks may be complex. In practice, however, only a portion of an image may be desired for access. For example, only a particular digit may actually need to be updated in a digital watch of a cellular phone.

Conventionally, however, an entire image may be required to be decoded during an encoding operation to access and update any particular portion of the image, i.e., the entire image may need to be decoded to update only a portion of a displayed image. In this case, since resources may be unnecessarily wasted, the efficiency of image processing may be reduced.

SUMMARY

Accordingly, one or more embodiments set forth a technique that may enable a particular portion of an image to be randomly accessed without encoding or decoding the entire image.

According to an aspect of one or more embodiments, there may be provided an image encoding system and method that may perform coding based on a processing unit including at least one block, and thereby may perform random access with respect to a particular portion of an image.

According to an aspect of one or more embodiments, there may be provided an image encoding system and method that may perform coding at a fixed bit rate depending on a pixel or block, and thereby may easily ascertain location information of a particular block, and perform random access.

According to an aspect of one or more embodiments, there may be provided image encoding system, including an intra prediction unit to perform intra prediction with respect to an input image based on a processing unit of the input image, a pixel coding unit to code a pixel of the processing unit with respect to the input image by performing the intra prediction based on the processing unit, and a bitstream generation unit to generate a bitstream with respect to the input image by coding the pixel using a Fixed Length Code (FLC).

The pixel coding unit may include a Differential Pulse Code Modulation (DPCM) coding unit to perform DPCM coding with respect to a current pixel of the processing unit using a size of a FLC and a reference pixel of the processing unit, a Pulse Code Modulation (PCM) coding unit to perform PCM coding with respect to the current pixel using the size of the FLC, and a mode determination unit to determine a coding mode with respect to the current pixel based on a Quantization Parameter (QP) used for the DPCM coding or the PCM coding.

The DPCM coding unit may include a DPCM generation unit to generate a DPCM of the current pixel using the current pixel and the reference pixel, a DPCM range determination unit to determine a DPCM range of the current pixel based on a bit size assigned to the DPCM, a DPCM value determination unit to determine whether the generated DPCM is within the DPCM range, and a QP adjustment unit to adjust the QP, used to generate the DPCM, when the DPCM is not within the DPCM range.

The PCM coding unit may include a QP determination unit to determine a QP of the current pixel, and a PCM generation unit to generate a PCM of the current pixel using the QP.

According to an aspect of one or more embodiments, there may be provided an image encoding method, including performing intra prediction with respect to an input image based on a processing unit of the input image, coding a pixel of the processing unit with respect to the input image by performing the intra prediction based on the processing unit, and generating a bitstream with respect to the input image by coding the pixel using a FLC.

The coding may include performing DPCM coding with respect to a current pixel of the processing unit using a size of a FLC and a reference pixel of the processing unit, performing PCM coding with respect to the current pixel using the size of the FLC, and determining a coding mode with respect to the current pixel based on a QP used for the DPCM coding or the PCM coding.

Additional aspects of the one or more embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the one or more embodiments, taken in conjunction with the accompanying drawings of which.

DETAILED DESCRIPTION

Figure 1:
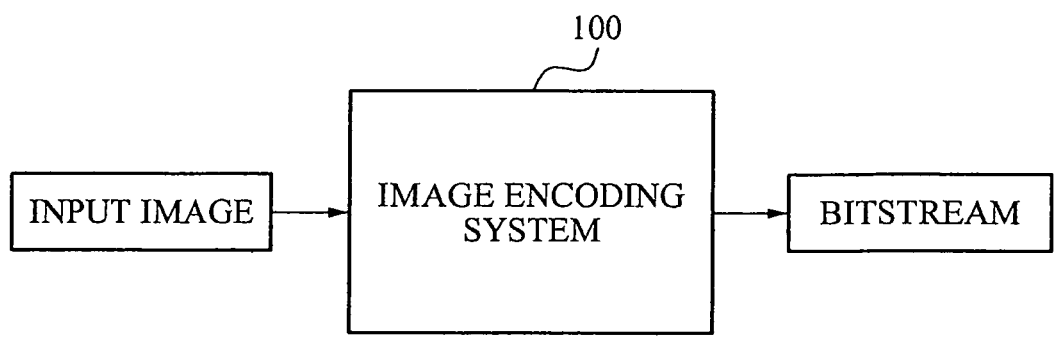
FIG. 1 illustrates a diagram of an operation of an image encoding system, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a diagram of an operation of an image encoding system 100, according to one or more embodiments.

Referring to FIG. 1, the image encoding system 100 may generate a bitstream by coding an input image. In this instance, the image encoding system 100 may generate the bitstream from the input image based on a plurality of processing units (PUs). Specifically, the image encoding system 100 may perform coding based on a PU which is defined as a basic element of the input image, as opposed to performing coding with respect to the entire input image.

That is, the image encoding system 100 may perform coding with respect to a PU corresponding to a predetermined portion to randomly access the predetermined portion of the input image, without performing coding, or the need of the same, from a start portion of the input image. Accordingly, an access speed may be improved and power consumption may be reduced.

In one or more embodiments, the image encoding system 100 may be applied to a Display Driver Integrated Circuit (DDI), a Frame Rate Converter (FRC), and the like.

A DDI may store the input image in an external memory, and output the image on a display device. In this instance, the DDI may update only a portion of the input image to reduce power consumption. For this, the image encoding system 100 capable of performing random access may be applied. For example, when a digit is to be changed in a digital watch, the image encoding system 100 may update by coding only a PU including the digit, without decoding an entire image for encoding the corresponding portion of the image with the changed digit.

The FRC may indicate a device that may change a frame rate of the input image. A reference image may be accessed to change the frame rate through Motion Estimation (ME) and Motion Compensation (MC). However, when an access is performed with respect to the entire input image, a significant bandwidth may be required. Accordingly, the image encoding system 100 capable of random access with respect to the predetermined portion of the input image may be applied.

Figure 2:
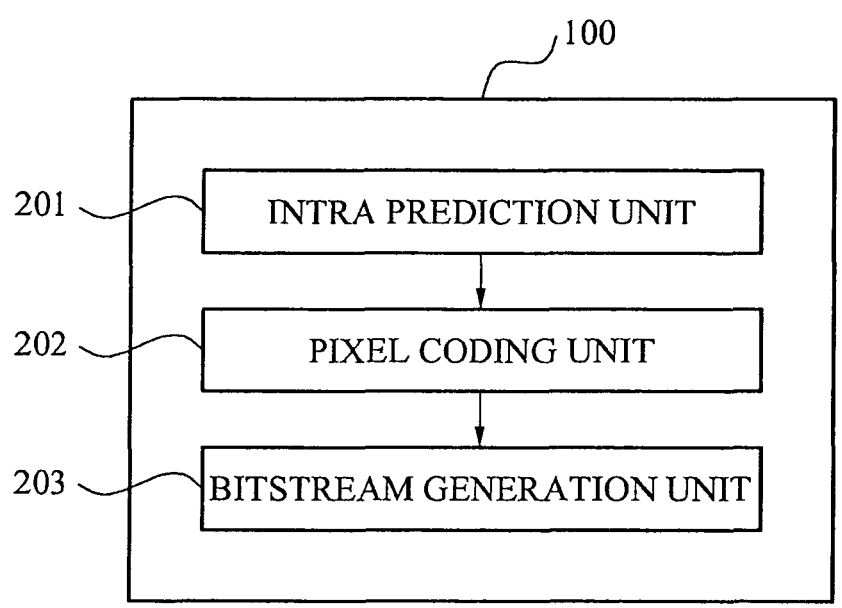
FIG. 2 illustrates a block diagram of a configuration of an image encoding system, according to one or more embodiments.

FIG. 2 illustrates a block diagram of a configuration of an image encoding system 100, according to one or more embodiments.

Referring to FIG. 2, the image encoding system 100 may include an intra prediction unit 201, a pixel coding unit 202, and a bitstream generation unit 203, for example.

The intra prediction unit 201 may perform intra prediction with respect to an input image based on a PU. The intra prediction unit 201 may generate reference data for pixel coding.

In this instance, the PU may include at least one block including a plurality of pixels. Also, the input image may include at least one PU. That is, the intra prediction may be performed based on the at least one block of the input image.

When the intra prediction is performed using adjacent pixels, all reference pixels located around a current pixel, which is to be accessed, are to be restored during the encoding. However, since the intra prediction unit 201 performs intra prediction based on the PU, when reference pixels included in the PU are restored, the intra prediction may be performed. The PU is described in greater detail with reference to FIGS. 3 through 5.

For example, the intra prediction unit 201 may perform intra prediction by determining a value of a prediction block based on a reference block in a PU. The reference block may include at least one Pulse Code Modulation (PCM) pixel, and the prediction block may include at least one PCM pixel or at least one Differential PCM (DPCM) pixel. The reference block and the prediction block are described in greater detail with reference to FIG. 6.

The pixel coding unit 202 may code a pixel with respect to the input image where the intra prediction is performed based on the PU. The pixel coding unit 202 may perform PCM coding or DPCM coding with respect to a pixel included in the PU. The PCM coding may code a current pixel without using the reference pixel. Also, the DPCM coding may code a difference between the current pixel and the reference pixel using the reference pixel. The pixel coding unit 202 is described in greater detail with reference to FIGS. 8 through 12.

The bitstream generation unit 203 may generate a bitstream with respect to the input image where the pixel is coded using a Fixed Length Code (FLC). In an embodiment, when a pixel or a block is coded at a variable bit rate, all previous bitstreams of a pixel or a block to be accessed should be decoded for random access. Accordingly, the bitstream generation unit 203 may code the pixel or block at a fixed bit rate, and thereby may enable location information of the pixel or block to be easily ascertained. For example, the bitstream generation unit 203 may generate the bitstream by coding pixel data and a coding mode based on a block of a PU.

Figure 3:
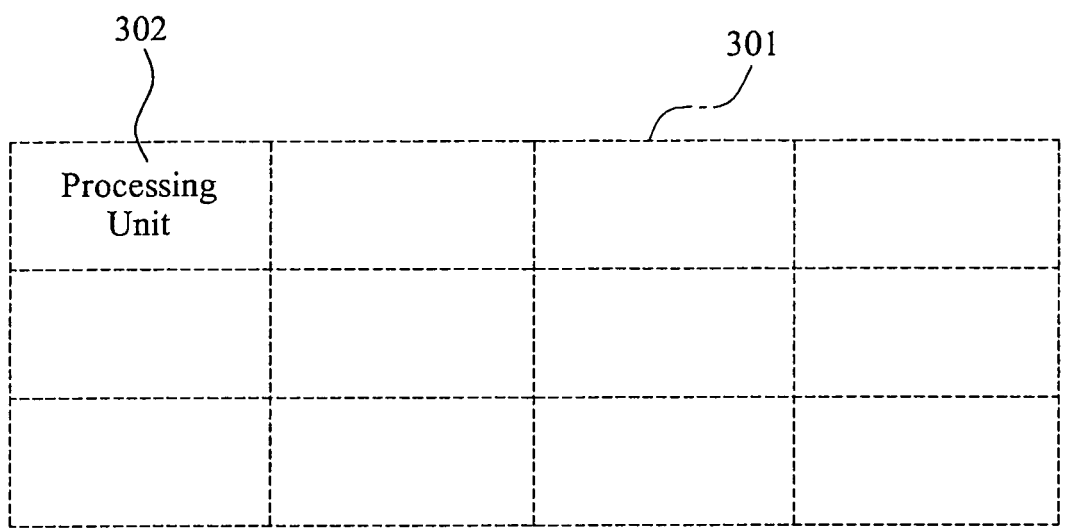
FIG. 3 illustrates a diagram of processing units, according to one or more embodiments.

FIG. 3 illustrates a diagram of a PU, according to one or more embodiments.

As illustrated in FIG. 3, an input image 301 may include at least one PU. A single PU may be included in the input image, or a plurality of PUs may be included in the input image as illustrated in FIG. 3. In this instance, a PU 302 may be a smallest unit that may be randomly accessed by the image encoding system 100, for example. The image encoding system 100 may perform intra prediction or pixel coding based only on the PU.

Figure 4:
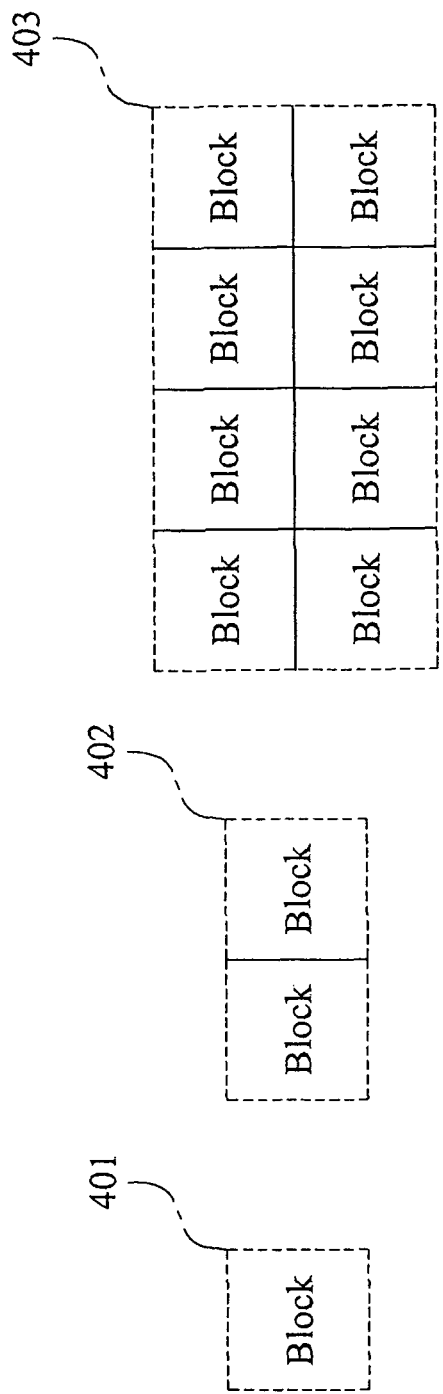
FIG. 4 illustrates processing units, according to one or more embodiments.

FIG. 4 illustrates PUs, according to one or more embodiments.

A PU 401 may include a single block. A PU 402 may include two blocks. Also, a PU 403 may include eight blocks. That is, the PU may include at least one block.

In this instance, each block may be a basic unit of coding. That is, the image encoding system 100 may perform coding based on a block included in a PU to be accessed, without using a block included in another PU.

Figure 5:
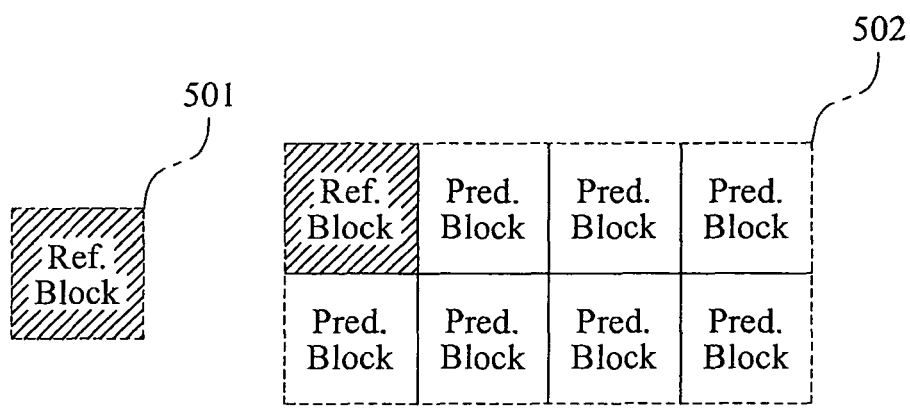
FIG. 5 illustrates a type of a block in a processing unit, according to one or more embodiments.

FIG. 5 illustrates a type of a block in a PU, according to one or more embodiments.

Referring to FIG. 5, a PU 501 may include a reference block. A PU 502 may also include seven prediction blocks and a single reference block, for example. For intra prediction, the PU may be required to include at least one reference block. That is, the PU may include only a reference block, or include at least one reference block and at least one prediction block, and only the reference block would be used for encoding the PU with the reference block and prediction block(s) without using reference blocks outside of the PU.

In this instance, the reference block may indicate a block as a reference for intra prediction in the PU, and be a first block in the PU. Also, the prediction block may indicate a block where intra prediction is performed in the PU, and remaining blocks excluding the first block in the PU.

Figure 6:
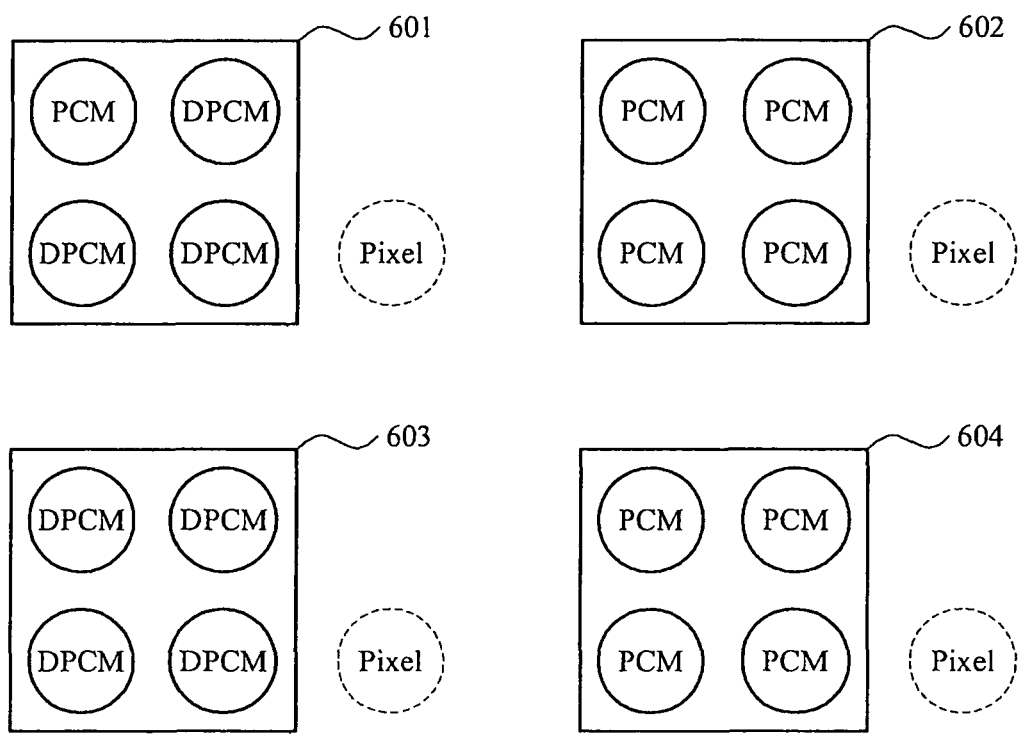
FIG. 6 illustrates a processing unit including a reference block and a prediction block, according to one or more embodiments.

FIG. 6 illustrates a processing unit including a reference block and a prediction block, according to one or more embodiments.

A PU may include at least one reference block for intra prediction. For example, a reference block 601 of the PU may include a PCM pixel and DPCM pixels. Also, a reference block 602 of the PU may include only PCM pixels. That is, the reference block 602 may include at least one PCM pixel.

Also, a prediction block 603 of the PU may include only DPCM pixels. A prediction block 604 of the PU may include only PCM pixels. Although not illustrated in FIG. 6, a prediction block may include DPCM pixels and a PCM pixel.

Figure 7:
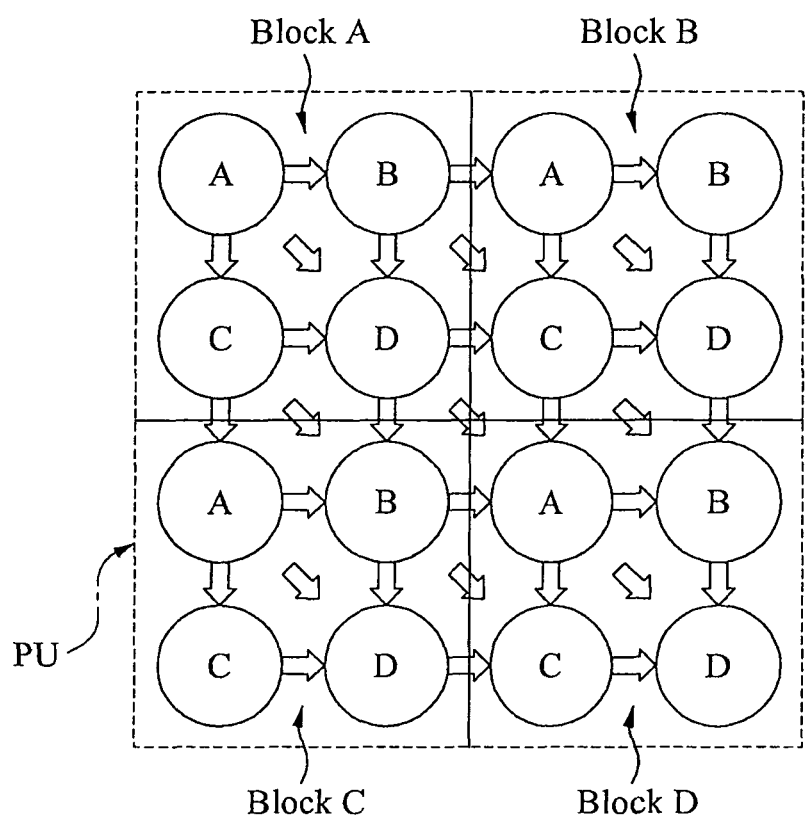
FIG. 7 illustrates a location of a reference pixel with respect to a current pixel for intra prediction, according to one or more embodiments.

FIG. 7 illustrates a location of a reference pixel with respect to a current pixel for intra prediction, according to one or more embodiments.

A PU, illustrated in FIG. 7, may include four blocks, a block A, a block B, a block C, and a block D, for example. Each of the four blocks may include four pixels. As only an example, the illustrated arrows between pixels in FIG. 7 indicate a direction of intra prediction for each pixel. The below Table 1 demonstrates such example directions.

TABLE 1

|  | Pixel A | Pixel B | Pixel C | Pixel D |
|---|---|---|---|---|
| Block A | No pred. | Left | upper | Left or upper or upper-left |
| Block B | left | Left | Left or upper or upper-left | Left or upper or upper-left |
| Block C | upper | Left or upper or upper-left | upper | Left or upper or upper-left |
| Block D | Left or upper or upper-left | Left or upper or upper-left | Left or upper or upper-left | Left or upper or upper-left |

Intra prediction between blocks may be performed in a PU. When the block A and the block B are included in different PUs, the image encoding system 100 may not predict the block B using the block A. However, as illustrated in FIG. 7, blocks A-D are within the same PU.

As illustrated in Table 1, since a pixel A of the block A may be a first pixel of a PU, intra prediction may not be performed. That is, the pixel A of the block A may be a reference pixel to predict a pixel value included in the PU.

The image encoding system 100 may perform intra prediction using the pixel A where the pixel value is determined, and determine a pixel value of each of a pixel B and a pixel C of the block A based on a result of the intra prediction. Also, a pixel value of a pixel D of the block A may be determined based on all the pixel values of the pixel B and the pixel C or each of the pixel values of the pixel B and the pixel C. Also, the pixel value of the pixel D of the block A may be determined based on the pixel value of the pixel A of the block A. Although not illustrated in Table 1, the pixel value of the pixel C of the block A may be determined based on the pixel value of the pixel B where the intra prediction is performed (upper-right).

Figure 8:
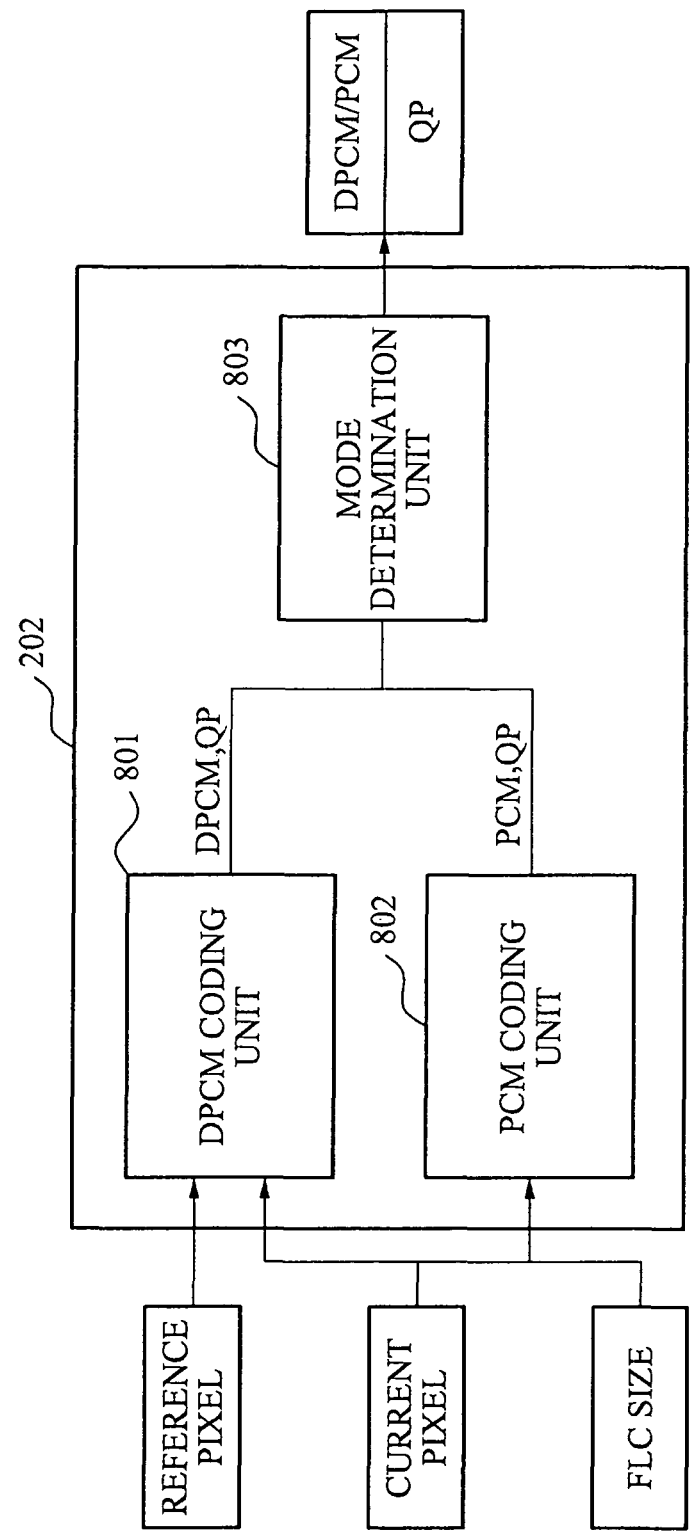
FIG. 8 illustrates a block diagram of a configuration of a pixel coding unit, according to one or more embodiments.

FIG. 8 illustrates a block diagram of a configuration of the pixel coding unit 202, according to one or more embodiments.

Referring to FIG. 8, the pixel coding unit 202 may include a DPCM coding unit 801, a PCM coding unit 802, and a mode determination unit 803, for example. The pixel coding unit 202 may code a pixel with respect to the input image where the intra prediction is performed based on a PU.

The DPCM coding unit 801 may perform DPCM coding with respect to the current pixel using a size of a FLC and a reference pixel. When the DPCM coding is performed, a DPCM of the current pixel and a Quantization Parameter (QP) may be obtained. The QP may be used when the DPCM coding is performed.

The PCM coding unit 802 may perform PCM coding with respect to the current pixel using the FLC size. When the PCM coding is performed, the PCM of the current pixel and a QP, used when the PCM coding is performed, may be obtained.

The mode determination unit 803 may determine a coding mode with respect to the current pixel using results of the DPCM coding and the PCM coding with respect to the current pixel. In this instance, the mode determination unit 803 may determine the coding mode with respect to the current pixel based on the QPs used when the DPCM coding and the PCM coding are performed. Specifically, the mode determination unit 803 may determine a coding mode having a small QP.

In this instance, the current pixel may have a pixel value of a current block to be coded. The reference pixel may have a pixel value of pixels located around the current pixel or a modified value of the pixel value. The FLC may be associated with a sub-pixel to be coded, and the FLC size may be used when coding is performed. That is, the FLC size may indicate a size of the sub-pixel to be coded.

The mode determination unit 803 may output the PCM or the DPCM, and the QPs used when the PCM coding and the DPCM coding are performed. Here, the PCM or the DPCM may be the result of the coding mode determined with respect to the current pixel.

Figure 9:
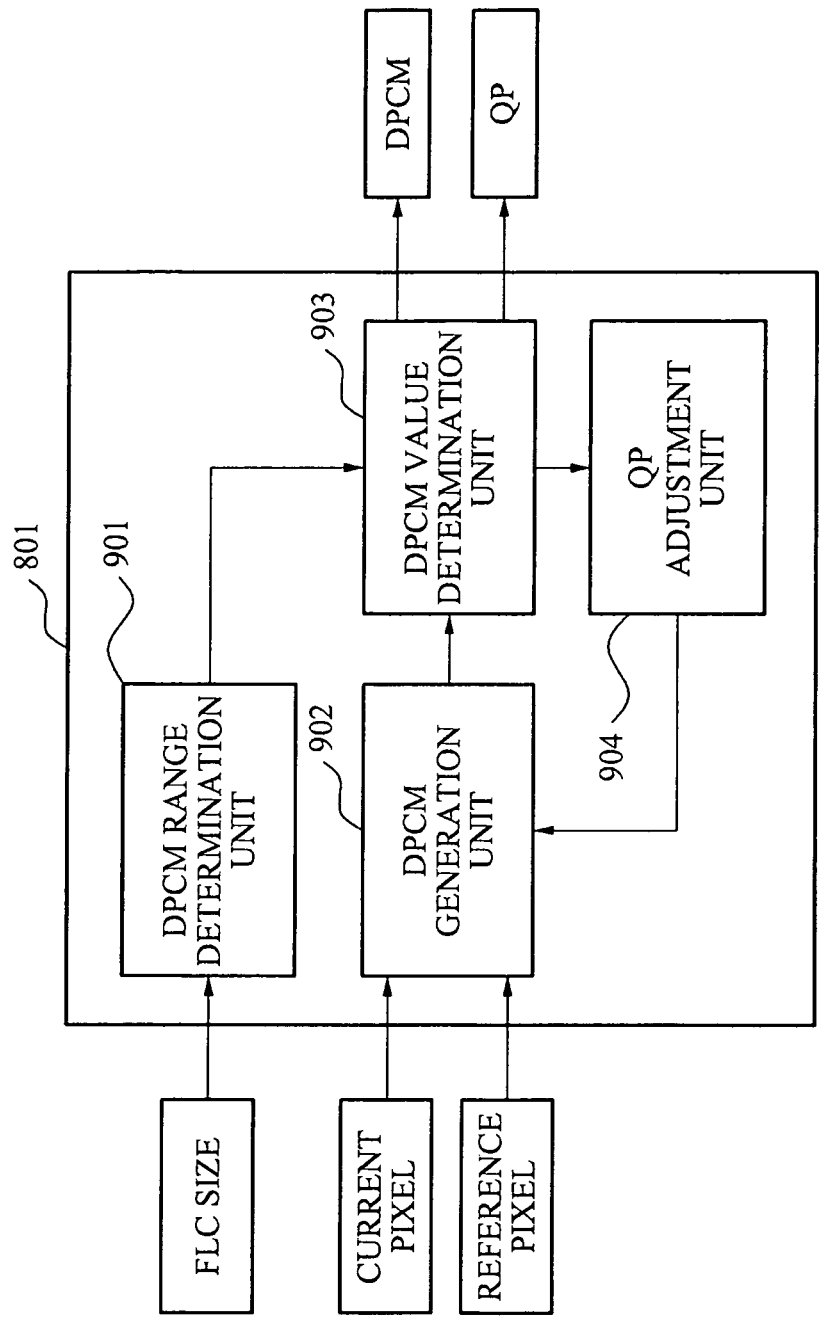
FIG. 9 illustrates a block diagram of a configuration of a Differential Pulse Code Modulation (DPCM) coding unit, according to one or more embodiments.

FIG. 9 illustrates a block diagram of a configuration of the DPCM coding unit 801, according to one or more embodiments.

Referring to FIG. 9, the DPCM coding unit 801 may include a DPCM range determination unit 901, a DPCM generation unit 902, a DPCM value determination unit 903, and a QP adjustment unit 904, for example.

The DPCM range determination unit 901 may determine a DPCM range of the current pixel based on a bit size assigned to the DPCM. For example, the DPCM range determination unit 901 may determine the DPCM range of the current pixel according to the below Equation 1, for example.

$$\text{Range}=(-2^{K-1}) \sim (2^{K-1}-1) \text{ or Range}=(-2^{K-1}+1) \sim (2^{K-1}) \quad \text{Equation 1}$$

Here, 'Range' may denote the DPCM range, and K may denote the bit size assigned to the DPCM.

The DPCM generation unit 902 may generate the DPCM of the current pixel using the current pixel and the reference pixel. For example, the DPCM generation unit 902 may generate the DPCM of the current pixel according to the below Equation 2, for example.

$$DPCM = Pixel_{Cur} - Pixel_{Ref}$$

$$DPCM = (Pixel_{Cur}/QP) - (Pixel_{Ref}/QP) \text{ or,}$$

$$DPCM = (Pixel_{Cur} - Pixel_{Ref})/QP \quad \text{Equation 2}$$

Here, 'Pixel$_{cur}$' may denote a pixel value of the current pixel, and 'Pixel$_{Ref}$' may denote a pixel value of the reference pixel, which is located around the current pixel, or a modified value of the pixel value. Also, 'QP' may denote a QP used when the DPCM is generated. Lossy coding may be performed by the QP.

The DPCM value determination unit 903 may determine whether the generated DPCM is included in the DPCM range. When the generated DPCM is included in, i.e., within, the DPCM range, the DPCM coding unit 801 may output the DPCM and the QP. Conversely, when the generated DPCM is not included in the DPCM range, the QP adjustment unit 904 may adjust the QP which is used to generate the DPCM.

Specifically, the QP adjustment unit 904 may increase the QP used when the DPCM is generated, and the DPCM generation unit 902 may generate a DPCM again using the increased QP. In this instance, since the QP increases, the regenerated DPCM may be less than the initial DPCM according to Equation 2. Accordingly, the regenerated DPCM may be included in the DPCM range. The above-described operation may be repeated until the DPCM is included in the DPCM range.

Figure 10:
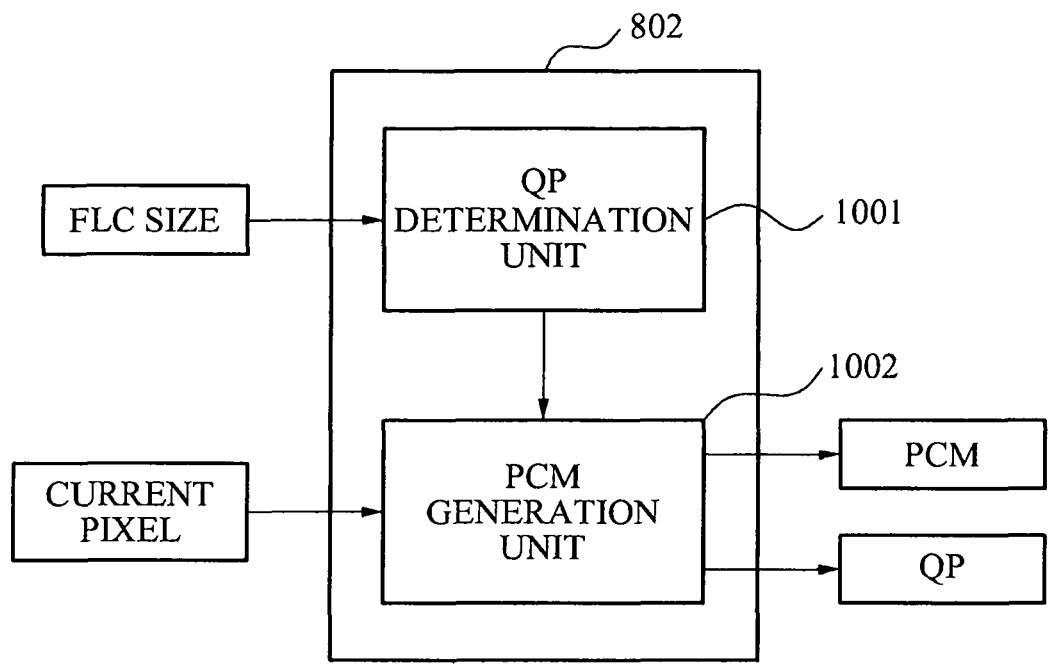
FIG. 10 illustrates a block diagram of a configuration of a Pulse Code Modulation (PCM) coding unit, according to one or more embodiments.

FIG. 10 illustrates a block diagram of a configuration of the PCM coding unit 802, according to one or more embodiments.

Referring to FIG. 10, the PCM coding unit 802 may include a QP determination unit 1001 and a PCM generation unit 1002, for example.

The QP determination unit 1001 may determine the QP of the current pixel. For example, the QP determination unit 1001 may determine the QP of the current pixel based on the FLC size. In this instance, the QP determination unit 1001 may determine the QP of the current pixel according to the below Equation 3, for example.

$$QP = 2^{N-M} (N \geq M) \quad \text{Equation 3}$$

Here, N may denote a bit depth of the current pixel, and M may denote the FLC size. Equation 3 may be simply an example, and an operation for QP determination may vary depending on a configuration of the image encoding system 100.

The PCM generation unit 1002 may generate the PCM of the current pixel using the QP. For example, the PCM generation unit 1002 may generate the PCM of the current pixel according to the below Equation 4, for example.

$$PCM = Cur/QP \quad \text{Equation 4}$$

Here, 'Cur' may denote a pixel value of the current pixel, and 'QP' may denote the Quantization Parameter.

According to Equation 3 and Equation 4, following example results may be obtained.

When a bit depth is 8 bits, and QP is 1, PCM=upper 8 bits (lossless).

When a bit depth is 8 bits, and QP is 2, PCM=upper 7 bits (lowest bit is removed).

When a bit depth is 8 bits, and QP is 4, PCM=upper 6 bits (lowest 2 bits are removed).

That is, as the QP increases, a value of lower bit, which is lost when the PCM is generated, may increase.

Figure 11:
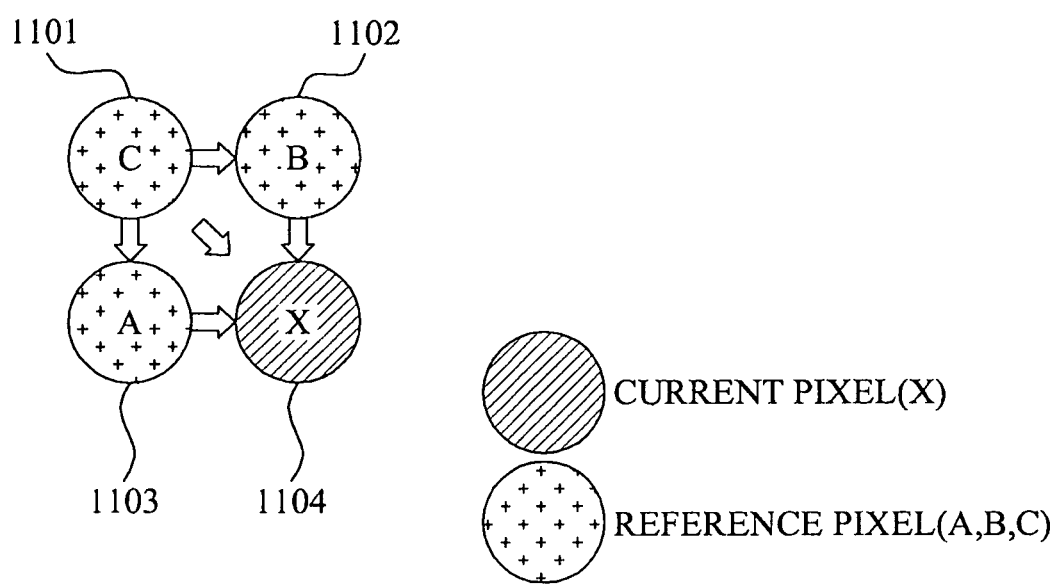
FIG. 11 illustrates a DPCM coding operation, according to one or more embodiments.

FIG. 11 illustrates a DPCM coding operation, according to one or more embodiments.

FIG. 11 illustrates a current pixel X 1104, a reference pixel A 1103, a reference pixel B 1102, and a reference pixel C 1101 included in a single block within a PU, for example.

As described above, DPCM coding may perform coding using a reference pixel located around a current pixel. Each of the reference pixel A 1103, the reference pixel B 1102, and the reference pixel C 1101 may be used or a combined pixel value of the three reference pixels 1101, 1102, and 1103 may be used to generate the DPCM of the current pixel X 1104.

That is, in Equation 2, 'Pixel$_{Ref}$' may be a pixel value of each of the reference pixel A 1103, the reference pixel B 1102, and the reference pixel C 1101, or be a combined pixel value of the reference pixel A 1103, the reference pixel B 1102, and the reference pixel C 1101.

Figure 12:
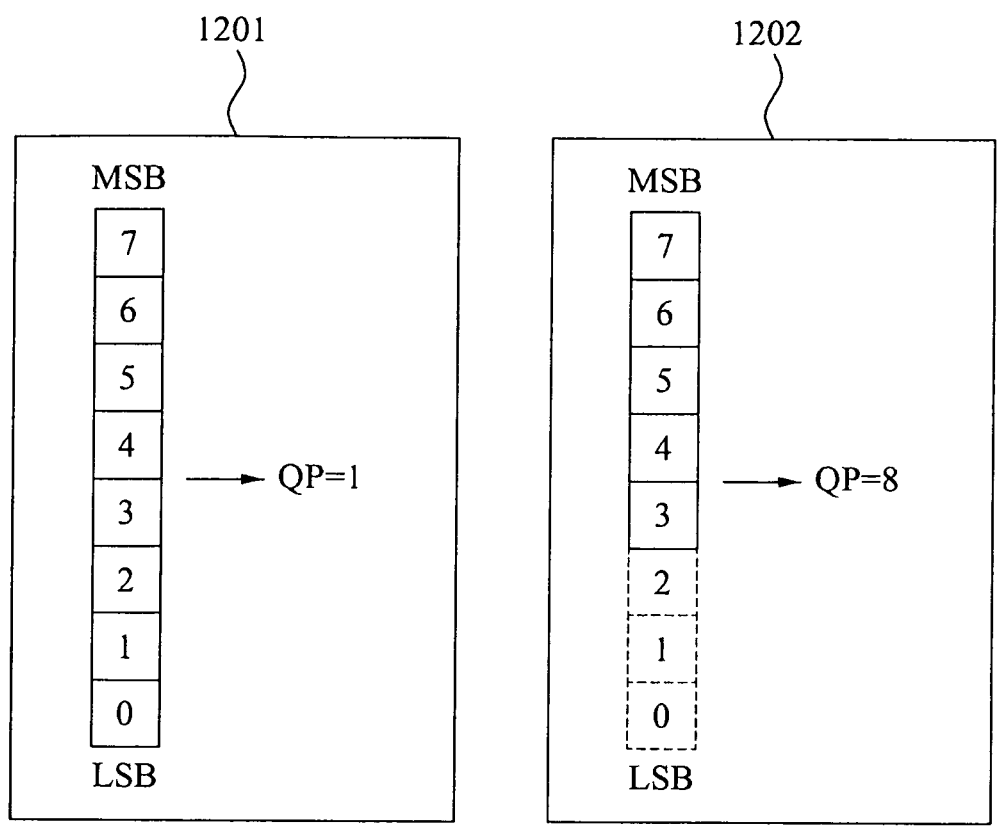
FIG. 12 illustrates a PCM coding operation, according to one or more embodiments.

FIG. 12 illustrates a PCM coding operation, according to one or more embodiments.

PCM coding may perform coding without using a reference pixel located around a current pixel. A PCM coding scheme 1201 may indicate a lossless coding of the current pixel. A PCM coding scheme 1202 may indicate coding by removing a portion of lower bits of the current pixel.

The current pixel illustrated in FIG. 12 may be 8 bits. The PCM coding scheme 1201 may be associated with when a QP is '1'. Also, the PCM coding scheme 1202 may be associated with when a QP is '8'. When the QP is '8', the PCM coding scheme 1202 may code the current pixel by removing lower three bits of the current pixel.

Figure 13:
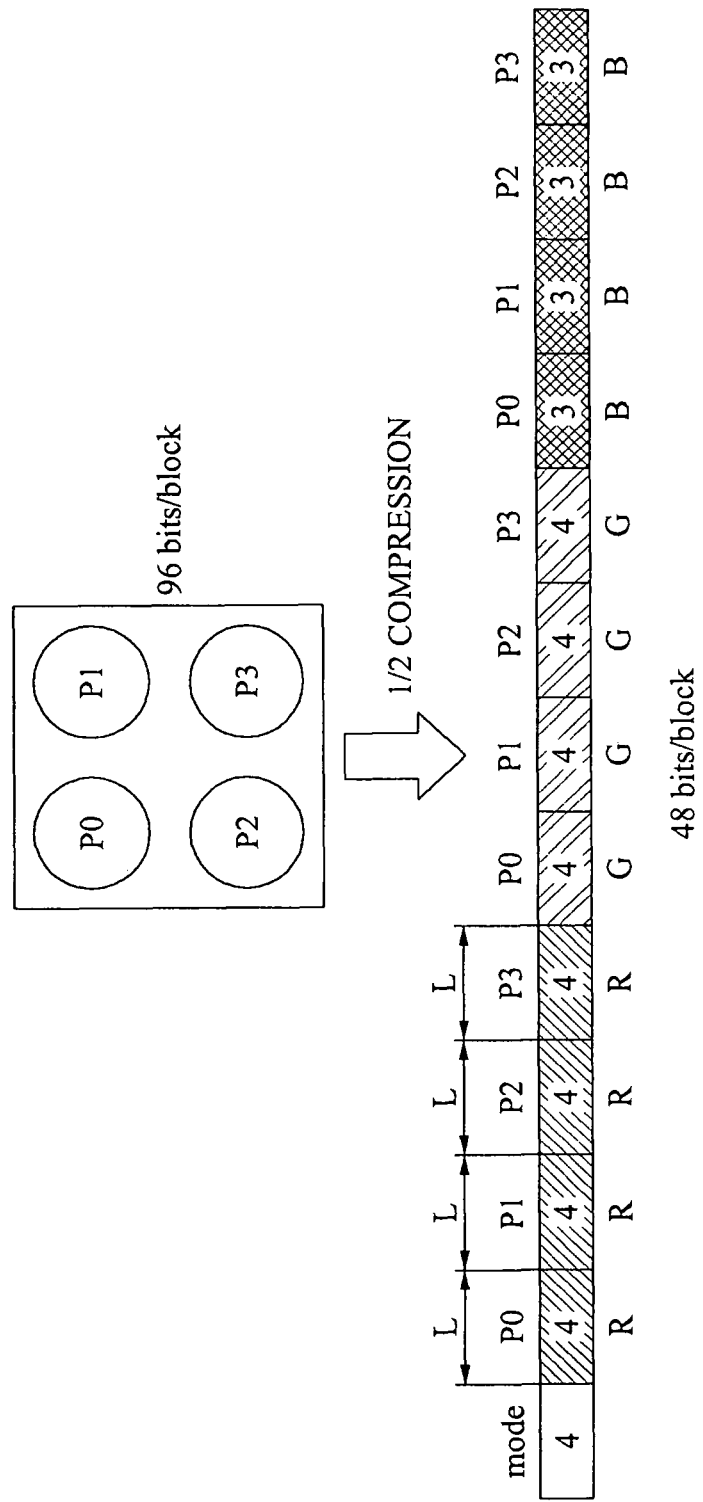
FIG. 13 illustrates an operation of a bitstream generation unit, according to one or more embodiments.

FIG. 13 illustrates an operation of the bitstream generation unit 203, according to one or more embodiments.

The bitstream generation unit 203 may generate a bitstream with respect to the input image where a pixel is coded using the FLC. As described above, when a variable bit rate is applied to each block, a location of a predetermined block is to be determined to perform random access with respect to the predetermined block. In this instance, a previous block of the predetermined block may be required to be decoded for encoding the predetermined block. However, the bitstream generation unit 203 may easily ascertain the location of the predetermined block for random access, by applying a fixed bit rate to each of the blocks.

For example, the bitstream generation unit 203 may generate the bitstream by coding pixel data and a coding mode based on a PU. When a single block includes 96 bits, the bitstream generation unit 203 may generate a bitstream of 48 bits for each block through ½ compression. Pixel data of a pixel P0, a pixel P1, a pixel P2, and a pixel P3 may be coded into a same length using the FLC.

In FIG. 13, a mode may indicate a coding mode, and include information about a QP, and DPCM coding or PCM coding. Also, the pixel P0, the pixel P1, the pixel P2, and the pixel P3 may be included in a block, and have four bits, respectively. Each of the pixel P0, the pixel P1, the pixel P2, and the pixel P3 may indicate one of Red (R), Green (G), and Blue (B). However, since the bitstream is required to include the coding mode, that is, four bits, B of the R, G, and B may indicate 12 bits.

Figure 14:
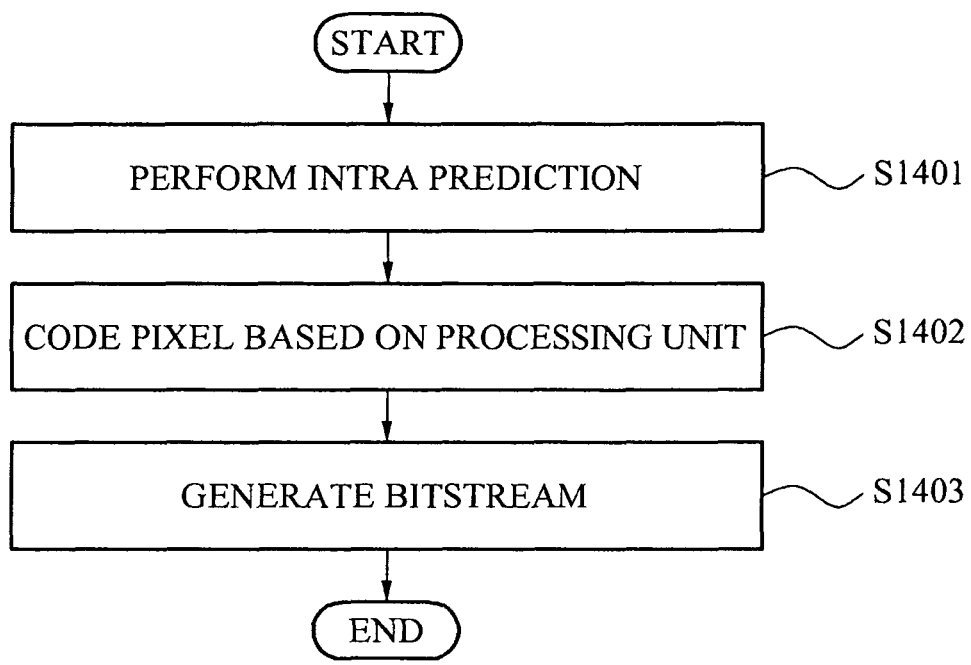
FIG. 14 illustrates a flowchart of an image encoding method, according to one or more embodiments.

FIG. 14 illustrates a flowchart of an image encoding method, according to one or more embodiments.

In operation S1401, intra prediction may be performed with respect to an input image based on a PU. In this instance, the PU may include at least one block including a plurality of pixels, and the input image may include at least one PU.

For example, intra prediction may be performed by determining a value of a prediction block based on a reference block in the PU. In this instance, the reference block may include at least one PCM pixel, and the prediction block may include at least one PCM pixel or at least one DPCM pixel.

In operation S1402, a pixel may be coded with respect to the input image by performing the intra prediction based only on the PU.

For example, DPCM coding may be performed with respect to a current pixel using a size of a FLC and a reference pixel. Also, PCM coding may be performed with respect to the current pixel using the size of the FLC. Sequentially, a coding mode may be determined with respect to the current pixel based on a QP which is used for the DPCM coding and the PCM coding.

When the DPCM coding is performed, a DPCM of the current pixel may be generated using the current pixel and the reference pixel. Sequentially, a DPCM range of the current pixel may be determined based on a bit size assigned to the DPCM, and it may be determined whether the generated DPCM is included in the DPCM range.

When the DPCM is included in the DPCM range, the DPCM and the QP may be output. Conversely, when the DPCM is not included in the DPCM range, the QP used when the DPCM is generated may be increased. Accordingly, the DPCM may be generated again using the increased QP.

When the PCM coding is performed, a QP of the current pixel may be determined. In this instance, the QP may be determined using a bit depth of the current pixel and the FLC size. Sequentially, a PCM of the current pixel may be generated using the QP.

In operation S1403, a bitstream with respect to the input image may be generated by coding the pixel using the FLC. For example, the bitstream may be generated by coding pixel data and a coding mode based on a block of the PU.

Descriptions of FIGS. 1 through 13 may be referred to for portions which have not been described in detail in FIG. 14.

In one or more embodiments, apparatus, system, and unit descriptions herein include one or more hardware processing elements. For example, outside of the described processing unit representing an element of an image, each described unit may include one or more processing elements, desirable memory, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. As only an example, computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image encoding system including one or more processing devices, comprising:
   an intra predictor, being at least one of the one or more processing devices, configured to perform intra prediction on a current block included in a processing unit of an input image and configured to output a residual block corresponding to difference between the current block and the intra-predicted block when the current block is not a reference block in the processing unit;
   a pixel coder, being at least one of the one or more processing devices, configured to code one or more pixels included in the residual block; and
   a bitstream generator, being at least one of the one or more processing devices, configured to generate a bitstream by coding the coded one or more pixels included in the residual block using a Fixed Length Code (FLC),
   wherein the reference block is used in the intra prediction of the current block,
   wherein a coding of the processing unit, in a coding of the image, includes at least one coded block capable of being randomly accessed from the coded image, and
   wherein the intra prediction is performed using the reference block included in the processing unit without using a block included in another processing unit of the input image.

2. The image encoding system of claim 1, wherein the bitstream generator is configured to generate the bitstream by coding pixel data of the processing unit and a coding mode based on a block of the processing unit.

3. The image encoding system of claim 1, wherein the intra predictor is configured to perform intra prediction by determining a value of a prediction block in the processing unit based on the reference block in the processing unit.

4. The image encoding system of claim 3, wherein the reference block includes at least one Pulse Code Modulation (PCM) pixel, and the prediction block includes at least one PCM pixel or at least one Differential PCM (DPCM) pixel.

5. The image encoding system of claim 1, wherein the pixel coder comprises:
   a DPCM coder configured to perform DPCM coding with respect to a current pixel of the processing unit using a size of a FLC and a reference pixel of the processing unit;
   a PCM coder configured to perform PCM coding with respect to the current pixel using the size of the FLC; and
   a mode determiner configured to determine a coding mode with respect to the current pixel based on a Quantization Parameter (QP) used for the DPCM coding or the PCM coding.

6. The image encoding system of claim 5, wherein the DPCM coder comprises:
- a DPCM generator configured to generate a DPCM of the current pixel using the current pixel and the reference pixel;
- a DPCM range determiner configured to determine a DPCM range of the current pixel based on a bit size assigned to the DPCM;
- a DPCM value determiner configured to determine whether the generated DPCM is within the DPCM range; and
- a QP adjustor configured to adjust the QP, used to generate the DPCM, when the DPCM is not within the DPCM range.

7. The image encoding system of claim 6, wherein the QP adjustor is configured to increase the QP when the DPCM is not within the DPCM range, and
the DPCM generator is configured to generate the DPCM using the increased QP.

8. The image encoding system of claim 5, wherein the PCM coder comprises:
- a QP determiner configured to determine a QP of the current pixel; and
- a PCM generator configured to generate a PCM of the current pixel using the QP.

9. The image encoding system of claim 8, wherein the QP determiner is configured to determine the QP using a bit depth of the current pixel and the size of the FLC.

10. An image encoding system including one or more processing devices, comprising:
- an intra predictor, being at least one of the one or more processing devices, configured to perform intra prediction on a current block included in a processing unit of an input image and is configured to output a residual block corresponding to difference between the current block and the intra-predicted block when the current block is not a reference block in the processing unit;
- a pixel coder, being at least one of the one or more processing devices, configured to code one or more pixels included in the residual block; and
- a bitstream generator, being at least one of the one or more processing devices, configured to generate a bitstream by coding the coded one or more pixels included in the residual block using a Fixed Length Code (FLC),
wherein the intra predictor is configured to perform intra prediction by determining a value of a prediction block in the processing unit based on the reference block in the processing unit, with the prediction block and the reference block being defined respective blocks of one or more pixels,
wherein a coding of the processing unit, in a coding of the image, includes at least one coded block capable of being randomly accessed from the coded image, and
wherein the intra prediction is performed using the reference block included in the processing unit without using a block included in another processing unit of the input image.

11. The image encoding system of claim 10, wherein the reference block includes at least one Pulse Code Modulation (PCM) pixel, and the prediction block includes at least one PCM pixel or at least one Differential PCM (DPCM) pixel.

12. An image encoding system including one or more processing devices, comprising:
- an intra predictor, being at least one of the one or more processing devices, configured to perform intra prediction on a current block included in a current processing unit of an input image and configured to output a residual block corresponding to difference between the current block and the intra-predicted block when the current block is not a reference block in the current processing unit;
- a pixel coder, being at least one of the one or more processing devices, configured to code one or more pixels included in the residual block; and
- a bitstream generator, being at least one of the one or more processing devices, configured to generate a bitstream by coding the coded one or more pixels included in the residual block using a Fixed Length Code (FLC),
wherein the pixel coder comprises:
- a DPCM coder configured to perform DPCM coding with respect to a current pixel of the current processing unit using a size of a FLC and a reference pixel of the current processing unit;
- a PCM coder configured to perform PCM coding with respect to the current pixel using the size of the FLC; and
- a mode determiner configured to determine a coding mode with respect to the current pixel based on a Quantization Parameter (QP) used for the DPCM coding or the PCM coding,
wherein the reference block is used in the intra prediction of the current block,
wherein a coding of the current processing unit, in a coding of the input image, includes at least one coded block capable of being randomly accessed from the coded input image, and
wherein the intra prediction is performed using the reference block included in the current processing unit without using a block included in another processing unit of the input image.

13. The image encoding system of claim 12, wherein the DPCM coder comprises:
- a DPCM generator configured to generate a DPCM of the current pixel using the current pixel and the reference pixel;
- a DPCM range determiner configured to determine a DPCM range of the current pixel based on a bit size assigned to the DPCM;
- a DPCM value determiner configured to determine whether the generated DPCM is within the DPCM range; and
- a QP adjustor configured to adjust the QP, used to generate the DPCM, when the DPCM is not within the DPCM range.

14. The image encoding system of claim 13, wherein the QP adjustor is configured to increase the QP when the DPCM is not within the DPCM range, and
the DPCM generator is configured to generate the DPCM using the increased QP.

15. The image encoding system of claim 13, wherein the intra prediction is performed with respect to the input image based on each of multiple defined processing units, of plural defined processing units of the input image including the current processing unit, not overlapping with respectively adjacent defined processing units of each of the multiple defined processing units.

16. The image encoding system of claim 12, wherein the PCM coder comprises:
- a QP determiner configured to determine a QP of the current pixel; and
- a PCM generator configured to generate a PCM of the current pixel using the QP.

17. The image encoding system of claim 16, wherein the QP determiner is configured to determine the QP using a bit depth of the current pixel and the size of the FLC.

18. An image encoding method, comprising:
performing intra prediction on a current block included in a processing unit of an input image to output a residual block corresponding to difference between the current block and the intra-predicted block if the current block is not a reference block in the processing unit;
coding one or more pixels included in the residual block; and
generating a bitstream by coding the coded one or more pixels included in the residual block using a Fixed Length Code (FLC),
wherein the reference block is used in the intra prediction of the current block,
wherein a coding of the processing unit, in a coding of the input image, includes at least one coded block capable of being randomly accessed from the coded input image, and
wherein the intra prediction is performed using the reference block included in the processing unit without using a block included in another processing unit of the input image.

19. The image encoding method of claim 18, wherein the generating of the bitstream generates the bitstream by coding pixel data of the processing unit and a coding mode based on a block of the processing unit.

20. The image encoding method of claim 18, wherein the performing performs intra prediction by determining a value of a prediction block in the processing unit based on the reference block in the processing unit.

21. The image encoding method of claim 20, wherein the reference block includes at least one Pulse Code Modulation (PCM) pixel, and the prediction block includes at least one PCM pixel or at least one Differential PCM (DPCM) pixel.

22. The image encoding method of claim 18, wherein the coding comprises:
performing DPCM coding with respect to a current pixel of the processing unit using a size of a FLC and a reference pixel of the processing unit;
performing PCM coding with respect to the current pixel using the size of the FLC; and
determining a coding mode with respect to the current pixel based on a Quantization Parameter (QP) used for the DPCM coding or the PCM coding.

23. The image encoding method of claim 22, wherein the performing of the DPCM coding comprises:
generating a DPCM of the current pixel using the current pixel and the reference pixel;
determining a DPCM range of the current pixel based on a bit size assigned to the DPCM;
determining whether the generated DPCM is within the DPCM range; and
adjusting the QP, used to generate the DPCM, when the DPCM is not within the DPCM range.

24. The image encoding method of claim 23, wherein the adjusting of the QP increases the QP when the DPCM is not within the DPCM range, and the generating of the DPCM generates the DPCM using the increased QP.

25. The image encoding method of claim 22, wherein the performing of the PCM coding comprises:
determining a QP of the current pixel; and
generating a PCM of the current pixel using the QP.

26. The image encoding method of claim 25, wherein the determining of the QP of the current pixel determines the QP using a bit depth of the current pixel and the size of the FLC.

27. An image encoding method, comprising:
performing intra prediction on a current block included in a processing unit of an input image to output a residual block corresponding to difference between the current block and the intra-predicted block when the current block is not a reference block in the processing unit
coding one or more pixels included in the residual block; and
generating a bitstream by coding the coded one or more pixels included in the residual block using a Fixed Length Code (FLC),
wherein the performing of the intra prediction includes performing intra prediction by determining a value of a prediction block in the processing unit based on the reference block in the processing unit, with the prediction block and the reference block being defined respective blocks of one or more pixels,
wherein a coding of the processing unit, in a coding of the input image, includes at least one coded block capable of being randomly accessed from the coded input image, and
wherein the intra prediction is performed using the reference block included in the processing unit without using a block included in another processing unit of the input image.

28. The image encoding method of claim 27, wherein the reference block includes at least one Pulse Code Modulation (PCM) pixel, and the prediction block includes at least one PCM pixel or at least one Differential PCM (DPCM) pixel.

29. An image encoding method, comprising:
performing intra prediction on a current block included in a processing unit of an input image to output a residual block corresponding to difference between the current block and the intra-predicted block when the current block is not a reference block in the processing unit;
coding one or more pixels included in the residual block; and
generating a bitstream by coding the coded one or more pixels included in the residual block using a Fixed Length Code (FLC),
wherein the coding comprises:
performing DPCM coding with respect to a current pixel of the processing unit using a size of a FLC and a reference pixel of the processing unit;
performing PCM coding with respect to the current pixel using the size of the FLC; and
determining a coding mode with respect to the current pixel based on a Quantization Parameter (QP) used for the DPCM coding or the PCM coding,
wherein the reference block is used in the intra prediction of the current block,
wherein a coding of the processing unit, in a coding of the input image, includes at least one coded block capable of being randomly accessed from the coded input image, and
wherein the intra prediction is performed using the reference block included in the processing unit without using a block included in another processing unit of the input image.

30. The image encoding method of claim 29, wherein the performing of the DPCM coding comprises:
generating a DPCM of the current pixel using the current pixel and the reference pixel;
determining a DPCM range of the current pixel based on a bit size assigned to the DPCM;
determining whether the generated DPCM is within the DPCM range; and
adjusting the QP, used to generate the DPCM, when the DPCM is not within the DPCM range.

31. The image encoding method of claim 30, wherein the adjusting of the QP increases the QP when the DPCM is not within the DPCM range, and the generating of the DPCM generates the DPCM using the increased QP.

32. The image encoding method of claim 29, wherein the performing of the PCM coding comprises:
  determining a QP of the current pixel; and
  generating a PCM of the current pixel using the QP.

33. The image encoding method of claim 32, wherein the determining of the QP of the current pixel determines the QP using a bit depth of the current pixel and the size of the FLC.

34. A non-transitory computer-readable recording medium embodied with computer readable code to control at least one processing device to implement an image encoding method, the method comprising:
  performing intra prediction on a current block included in a processing unit of an input image to output a residual block corresponding to difference between the current block and the intra-predicted block when the current block is not a reference block in the processing unit;
  coding one or more pixels included in the residual block; and
  generating a bitstream by coding the coded one or more pixels included in the residual block using a Fixed Length Code (FLC),
  wherein the reference block is used in the intra prediction of the current block,
  wherein a coding of the processing unit, in a coding of the input image, includes at least one coded block capable of being randomly accessed from the coded input image, and
  wherein the intra prediction is performed using the reference block included in the processing unit without using a block included in another processing unit of the input image.

35. An image processing method, comprising:
  receiving a bitstream including a reference block and a coded current block of a defined processing unit of an image, wherein the coded current block is coded by a Fixed Length Code (FLC);
  randomly accessing and extracting the coded current block from the bitstream using a fixed length, the random accessing including parsing the bitstream for the coded current block without requiring a parsing of the bitstream for another coded block of the image, except any coding of the reference block;
  performing intra prediction on the extracted current block based on the reference block; and
  determining a value for the extracted current block based on a result of the intra prediction of the extracted current block,
  wherein a result of the intra prediction of the extracted current block indicates a predicted block estimated from the reference block, and
  wherein the intra prediction is performed without using a block included in other processing units of the image.

36. The image processing method of claim 35, further comprising:
  modifying the predicted block;
  performing an updating intra prediction on the modified block, for inclusion in the processing unit, to output a residual block corresponding to difference between the modified block and the intra-predicted modified block;
  coding one or more pixels included in the residual block; and
  generating a bitstream by coding the coded one or more pixels included in the residual block using a Fixed Length Code (FLC),
  wherein the reference block is used in the updating intra prediction of the modified block,
  wherein a coding of the processing unit, in an updated entire coding of the image, includes at least one coded block capable of being randomly accessed from the updated coded image,
  wherein the updating intra prediction is performed using the reference block without using a block included in the other processing units of the image, and
  wherein the updated entire coding of the image is capable of being performed for only the modified block without requiring performing of respective updating intra predictions of the other processing units of the image.

* * * * *